(12) United States Patent
Pace

(10) Patent No.: US 8,104,219 B1
(45) Date of Patent: Jan. 31, 2012

(54) LIGHTED TIP FISHING POLE APPARATUS

(76) Inventor: Gary C. Pace, Cumming, GA (US)

(*) Notice: Subject to any disclaimer, the term of this patent is extended or adjusted under 35 U.S.C. 154(b) by 307 days.

(21) Appl. No.: 12/564,639

(22) Filed: Sep. 22, 2009

(51) Int. Cl.
*A01K 97/12* (2006.01)
*A01K 87/00* (2006.01)

(52) U.S. Cl. .............................. 43/17; 43/17.5
(58) Field of Classification Search .................. 43/17.5, 43/17
See application file for complete search history.

(56) References Cited

U.S. PATENT DOCUMENTS

| | | | | |
|---|---|---|---|---|
| 1,752,397 A | * | 4/1930 | See | 43/17 |
| 3,017,499 A | * | 1/1962 | Fore | 43/17.5 |
| 3,624,689 A | * | 11/1971 | Rizzo | 43/17 |
| 3,740,887 A | * | 6/1973 | Van Leeuwen | 43/17.5 |
| 4,117,618 A | * | 10/1978 | Utsler | 43/17.5 |
| 4,399,631 A | * | 8/1983 | Smith | 43/17 |
| 5,179,797 A | * | 1/1993 | Edwards et al. | 43/17.5 |
| 5,205,061 A | * | 4/1993 | Echols, Jr. | 43/17.5 |
| 5,357,410 A | * | 10/1994 | Cota et al. | 43/17.5 |
| 5,406,735 A | * | 4/1995 | Howell | 43/17.5 |
| 5,586,403 A | * | 12/1996 | Ward | 43/17.5 |
| 5,644,864 A | * | 7/1997 | Kelly | 43/17.5 |
| 5,738,433 A | * | 4/1998 | Sparks | 43/17.5 |
| 5,943,809 A | * | 8/1999 | Ring | 43/17.5 |
| 6,000,808 A | * | 12/1999 | Hansen | 43/17.5 |
| 6,122,853 A | * | 9/2000 | Genous-Moore | 43/17.5 |
| 6,405,475 B1 | * | 6/2002 | Wallace et al. | 43/17.5 |
| 6,446,380 B1 | * | 9/2002 | Radosavljevic et al. | 43/17 |
| 6,546,665 B1 | * | 4/2003 | Eldredge et al. | 43/17.5 |
| 6,789,348 B1 | * | 9/2004 | Kneller et al. | 43/17.5 |
| 7,003,912 B1 | * | 2/2006 | Morgan et al. | 43/17 |
| 7,051,470 B2 | * | 5/2006 | Lybarger et al. | 43/17.5 |
| 7,111,425 B1 | * | 9/2006 | Cormier | 43/17.5 |
| 7,614,177 B1 | * | 11/2009 | Wheeler | 43/17.5 |
| 2004/0159039 A1 | * | 8/2004 | Yates et al. | 43/17.5 |
| 2006/0288629 A1 | * | 12/2006 | Parker et al. | 43/17.5 |

FOREIGN PATENT DOCUMENTS

| | | | | |
|---|---|---|---|---|
| GB | 2052231 A | * | 1/1981 | |
| GB | 2170084 A | * | 7/1986 | |
| GB | 2175781 A | * | 12/1986 | |
| GB | 2196222 A | * | 4/1988 | |
| GB | 2258981 A | * | 3/1993 | |
| JP | 07023678 A | * | 1/1995 | |
| JP | 09252684 A | * | 9/1997 | |
| JP | 2001148968 A | * | 6/2001 | |
| JP | 2002125528 A | * | 5/2002 | |

* cited by examiner

*Primary Examiner* — Darren W Ark

(57) ABSTRACT

The lighted tip fishing pole apparatus provides a lighted tip pole with intensity adjustment of the lighted tip as well as on/off control. The apparatus is electrically efficient in order to extend battery life, thereby enabling extended use. The apparatus ensures against electrical failure of the lighted tip and related electrical connections by virtue of rod insulation, coiled wiring, straight wiring where needed, and positive, sealed connections and circuitry. The pole offers the same flexibility, threaded reel attachments, cushioned handle, eyelets, and cushioned grip fishermen require. The apparatus enables a fisherman to notice rod dip when a bite occurs, and thereby react, as opposed to an inability to do so in no light and low light conditions. With only the tip lighted, visibility of rod tip action is magnified. The further advantage of tip light intensity adjustment allows a fisherman to adjust to various light conditions.

2 Claims, 3 Drawing Sheets

LIGHTED TIP FISHING POLE APPARATUS

BACKGROUND OF THE INVENTION

To say that fishing equipment is crowded art may be the greatest understatement made, as fishermen love any possible improvement or gadget to increase their success and enjoyment of this widespread hobby and sport. Certainly fishing rods are a major equipment piece of fishing. As is well known, many fishermen enjoy night fishing and to that end, many variations in lighted fishing poles have been offered. Perhaps each known variation has at least some fans, with many being widely used. Some poles provide light for walking along a trail at night, as well as during fishing itself. Some poles effectively glow to aid in their night visibility. Many variations exist. What has been needed is an electrically efficient means for a fisherman to sight his rod tip at night. The present apparatus provides this problem solution, along with other unique features.

FIELD OF THE INVENTION

The lighted tip fishing pole apparatus relates to fishing poles and more especially to a lighted tip fishing pole with adjustable dimmer on/off switch, electrically efficient LED lighting, and flexible coiled wiring within the pole, therebetween.

SUMMARY OF THE INVENTION

The general purpose of the lighted tip fishing pole apparatus, described subsequently in greater detail, is to provide a lighted tip fishing pole apparatus which has many novel features that result in an improved lighted tip fishing pole apparatus which is not anticipated, rendered obvious, suggested, or even implied by prior art, either alone or in combination thereof.

To attain this, the lighted tip fishing pole apparatus provides a lighted tip pole with intensity adjustment of the lighted tip as well as on/off control. The apparatus is electrically efficient in order to extend battery life, thereby enabling extended use. Efficiency is derived both from the dimmer on/off switch adjustability as well as the use of LED lighting of the tip only. The apparatus ensures against electrical failure of the lighted tip and related electrical connections by virtue of rod insulation, coiled wiring, straight wiring where needed, and positive, sealed connections and circuitry. The pole offers the same flexibility, threaded reel attachments, cushioned handle, eyelets, and cushioned grip fishermen require.

The apparatus enables a fisherman to notice rod dip when a bite occurs, and thereby react, as opposed to an inability to do so in no light and low light conditions. With only the tip lighted, visibility of rod tip action is magnified, and battery energy is saved. The further advantage of tip light intensity adjustment allows a fisherman to adjust to various light conditions.

Thus has been broadly outlined the more important features of the improved lighted tip fishing pole apparatus so that the detailed description thereof that follows may be better understood and in order that the present contribution to the art may be better appreciated.

An object of the lighted tip fishing pole apparatus is to provide a lighted tip pole.

Another object of the lighted tip fishing pole apparatus is to provide intensity adjustment and on/off control of the lighted tip.

A further object of the lighted tip fishing pole apparatus is to be electrically efficient in order to extend battery life.

An added object of the lighted tip fishing pole apparatus is to ensure against electrical failure of the lighted tip and related electrical connections.

These together with additional objects, features and advantages of the improved lighted tip fishing pole apparatus will be readily apparent to those of ordinary skill in the art upon reading the following detailed description of presently preferred, but nonetheless illustrative, embodiments of the improved lighted tip fishing pole apparatus when taken in conjunction with the accompanying drawings.

In this respect, before explaining the current embodiments of the improved lighted tip fishing pole apparatus in detail, it is to be understood that the lighted tip fishing pole apparatus is not limited in its application to the details of construction and arrangements of the components set forth in the following description or illustration. Those skilled in the art will appreciate that the concept of this disclosure may be readily utilized as a basis for the design of other structures, methods, and systems for carrying out the several purposes of the improved lighted tip fishing pole apparatus. It is therefore important that the claims be regarded as including such equivalent constructions insofar as they do not depart from the spirit and scope of the lighted tip fishing pole apparatus. It is also to be understood that the phraseology and terminology employed herein are for purposes of description and should not be regarded as limiting.

BRIEF DESCRIPTION OF THE DRAWINGS

FIG. 2 is a perspective view of the second end of the pole and accompanying length there proximal to.

DETAILED DESCRIPTION OF THE DRAWINGS

With reference now to the drawings, and in particular FIGS. 1 through 4 thereof, the principles and concepts of the lighted tip fishing pole apparatus generally designated by the reference number 10 will be described.

Figure 1:
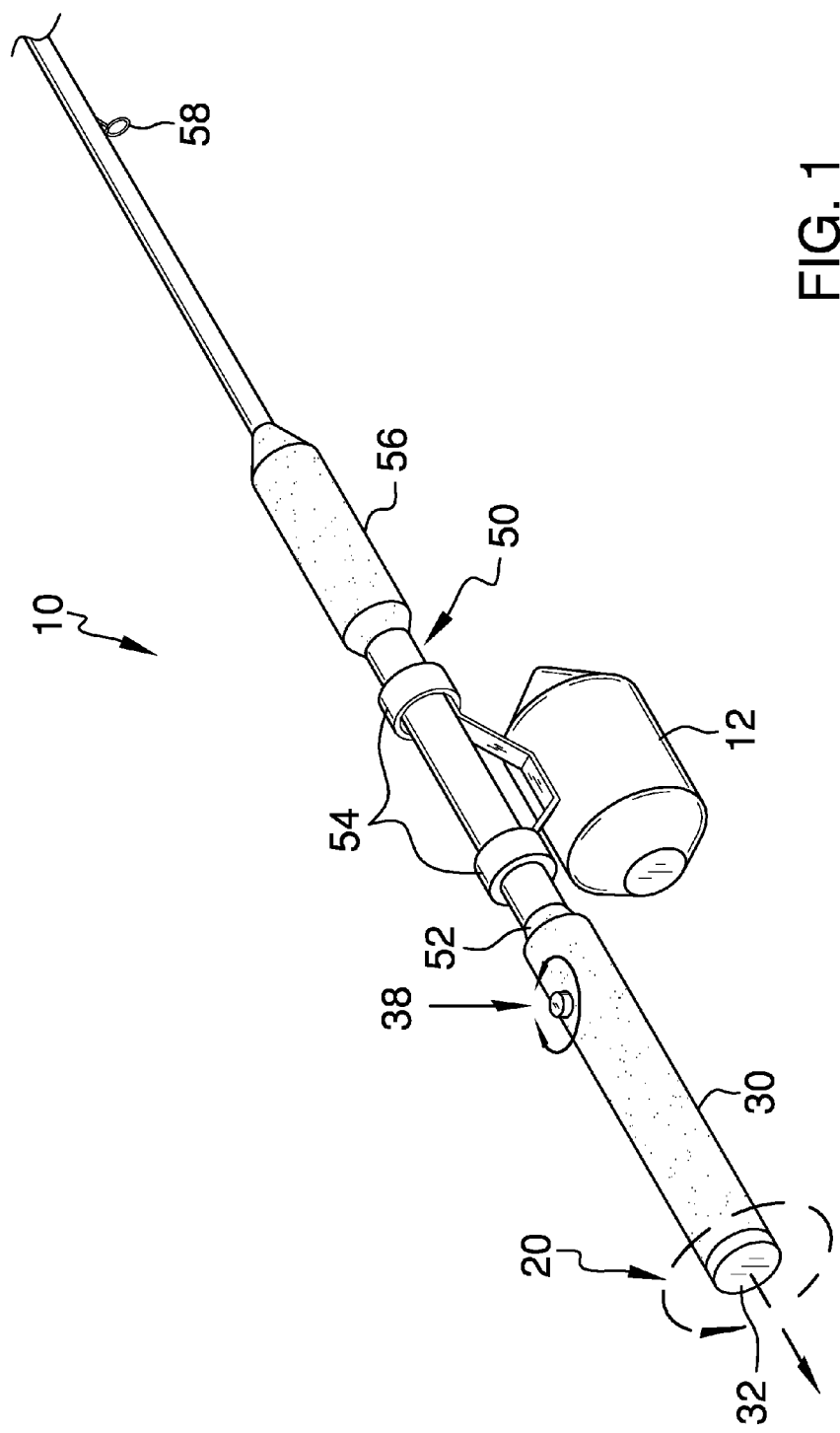
FIG. 1 is a perspective view of the cushioned handle and a portion of the pole, with existing reel attached.
Figure 2:
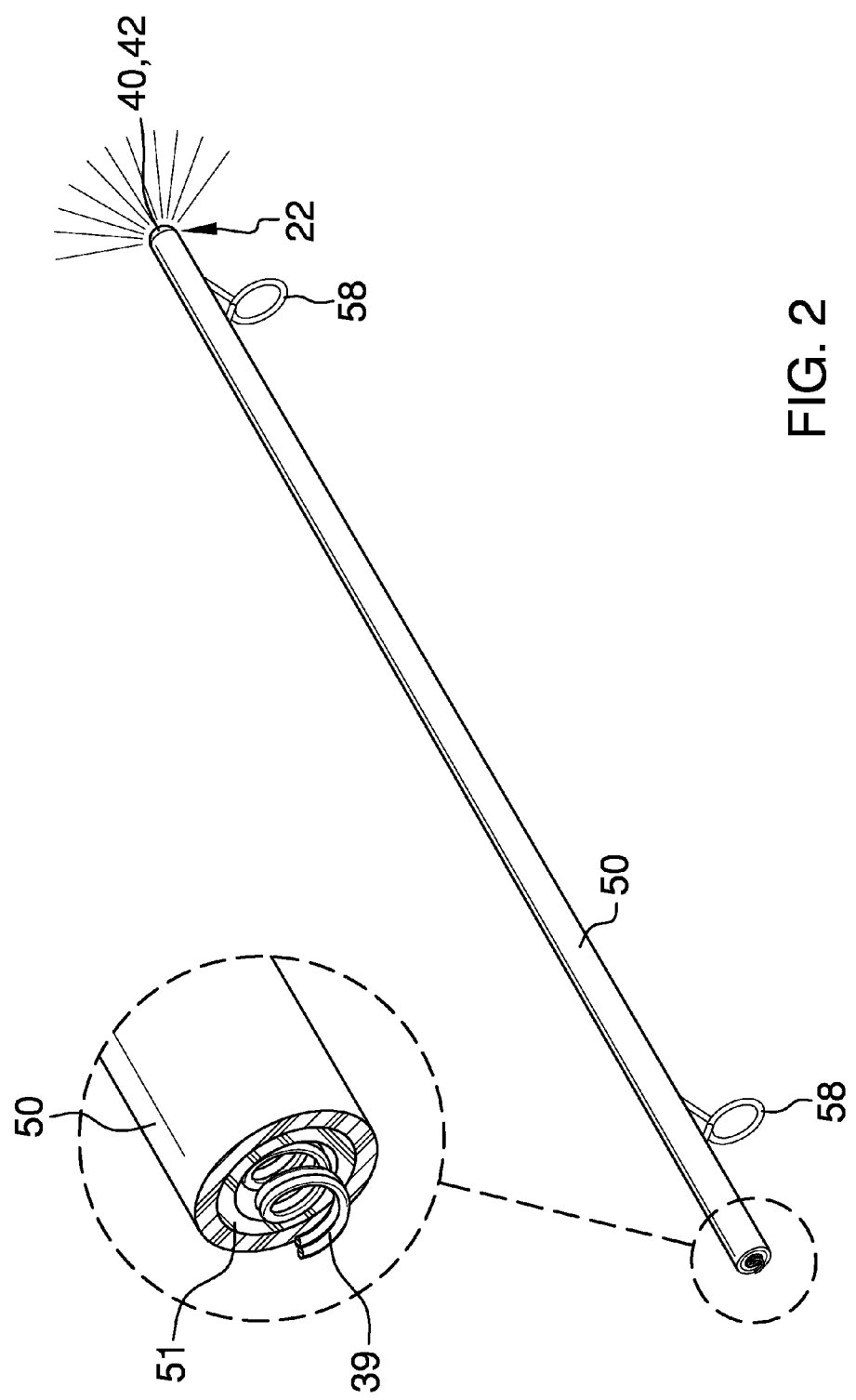

Referring to FIGS. 1 and 2, the apparatus 10 partially comprises a hollow flexible rod 50 having a first end 20 spaced apart from a second end 22.

Figures 3, 4:
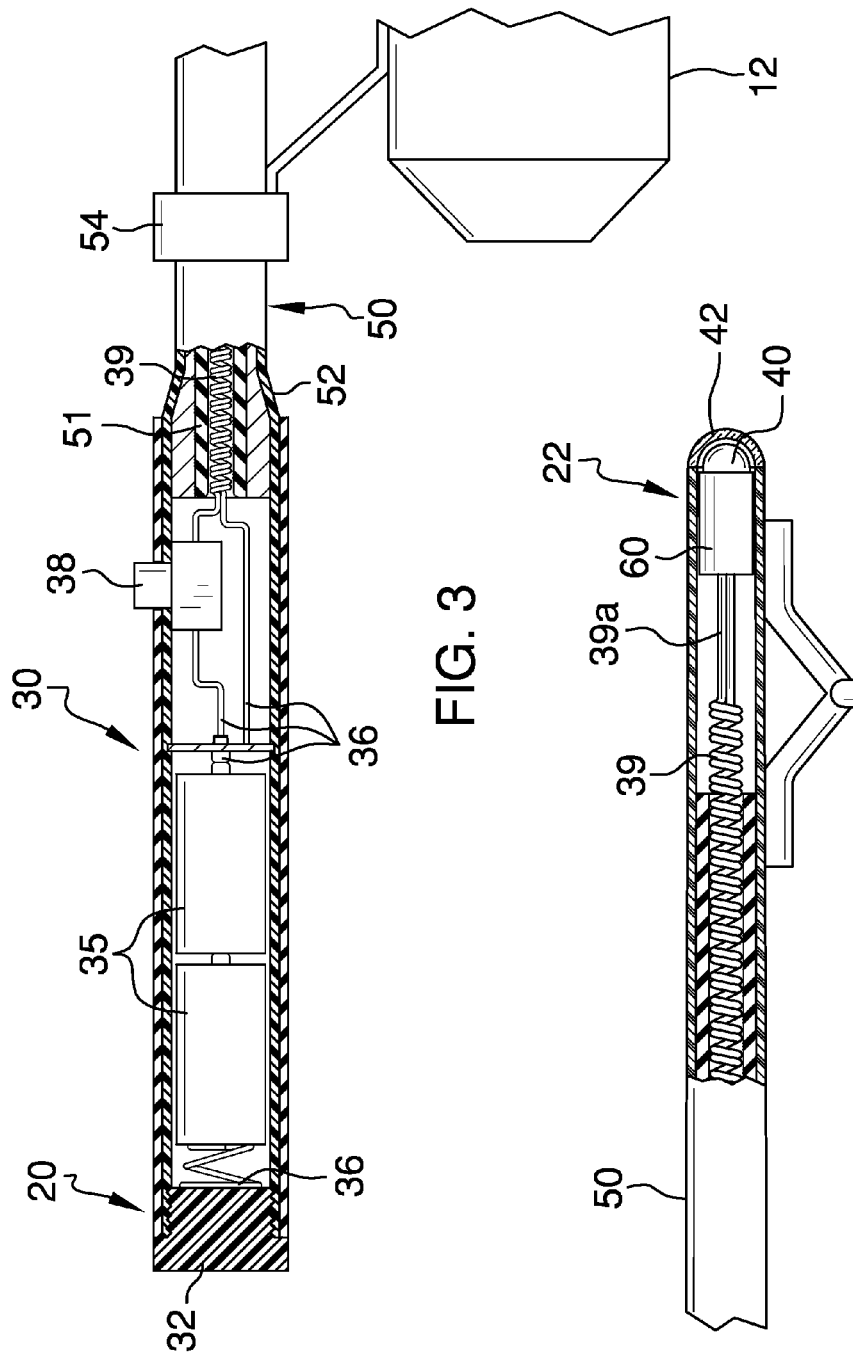
FIG. 3 is a cross sectional view of the cushioned handle.
FIG. 4 is a cross sectional view of the second end.

Referring to FIGS. 1 and 3, the apparatus 10 further comprises the cushioned handle 30 disposed at and proximal to the first end 20 of the rod 50. The cushioned handle 30 has a narrowing taper 52 medially disposed. The cushioned handle 30 further comprises at least two removable batteries 35. Depending upon the embodiment, various battery 35 types may be used and may therefore vary in number. The dimmer on/off switch 38 is disposed within the handle 30. The circuitry 36 connects the batteries 35 and the dimmer on/off switch 38. The coiled wiring 39 branches out and is connected to the circuitry 36 and the dimmer on/off switch 38. The screw cap 32 is removably affixed to the first end 20 and seals the rod 50 from moisture invasion until selectively removed to gain interior access to the handle 30. The insulation 51 is disposed within the rod 50.

Referring to FIGS. 2 and 4, the insulation 51 is disposed from the cushioned handle 30 to proximal to the second end 22. The coiled wiring 39 is continually disposed within the rod 50 from the cushioned handle 30 to proximal to the second end 22.

The insulation 51 and coiled wiring 39 importantly provide total electrical flexibility and insulation against failure of the electrical connection between the circuitry 36 and dimmer on/off switch 38 to the small section of straight wiring 39a at the rod 50 second end 22. The straight wiring 39a is extended from the coiled wiring 39 to the second end 22. The tip reinforcement 60 is disposed within the rod 50 second end 22. The rounded lens 42 is disposed on the second end 22. The LED 40 is disposed within the lens 42 and is anchored within the tip reinforcement 60. The LED 40 is connected to the straight wiring 39a within the tip reinforcement 60. This section of straight wiring 39a and LED 40 anchor and connection to the straight wiring 39a within the tip reinforcement 60 importantly provides the most full proof electrical dependability of the apparatus 10. The rounded lens 42 is removable for access to the LED 40.

Referring again to FIG. 1, the pair of threaded reel attachments 54 is disposed on the rod 50 proximal to the taper 52. The reel attachments 54 removably receive an existing reel 12. The cushioned grip 56 is disposed medially along the rod 50, proximal to the threaded reel attachments 54.

Referring again to FIGS. 1 and 2, the series of spaced apart eyelets 58 is affixed exteriorly to the rod 50. The eyelets 58 are disposed between the threaded reel attachments 54 and the second end 22.

With respect to the above description then, it is to be realized that the optimum dimensional relationships for the parts of the lighted tip fishing pole apparatus, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the lighted tip fishing pole apparatus.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the lighted tip fishing pole apparatus may be used.

Therefore, the foregoing is considered as illustrative only of the principles of the lighted tip fishing pole apparatus. Further, since numerous modifications and changes will readily occur to those skilled in the art, it is not desired to limit the lighted tip fishing pole apparatus to the exact construction and operation shown and described, and accordingly, all suitable modifications and equivalents may be resorted to, falling within the scope of the lighted tip fishing pole apparatus.

What is claimed is:

1. A lighted tip fishing pole apparatus, comprising, in combination:
 a hollow flexible rod having a first end spaced apart from a second end;
 a cushioned handle disposed at and proximal to the rod first end, the cushioned handle having a narrowing taper medially disposed along the rod, the cushioned handle further comprising:
 at least two removable batteries;
 a dimmer on/off switch;
 circuitry connecting the at least two batteries and the dimmer on/off switch;
 a coiled wiring connected to the circuitry and the dimmer on/off switch;
 a screw cap removably affixed to the first end;
 an insulation disposed within the rod, the insulation disposed from the cushioned handle to proximal the second end;
 a continuation of the coiled wiring disposed within the rod, the continuation of the coiled wiring extended from the cushioned handle to proximal to the second end;
 a straight wiring extended from the continuation of the coiled wiring to the second end;
 a rounded lens disposed on the second end;
 an LED disposed within the lens, the LED connected to the straight wiring;
 a pair of threaded reel attachments disposed on the rod proximal to the taper, the reel attachments removably receiving a reel;
 a cushioned grip disposed medially along the rod, proximal to the threaded reel attachments;
 a series of spaced apart eyelets affixed exteriorly to the rod, the eyelets disposed between the threaded reel attachments and the second end.

2. A lighted tip fishing pole apparatus, comprising, in combination:
 a hollow flexible rod having a first end spaced apart from a second end;
 a cushioned handle disposed at and proximal to the rod first end, the cushioned handle having a narrowing taper medially disposed along the rod, the cushioned handle further comprising:
 at least two removable batteries;
 a dimmer on/off switch;
 circuitry connecting the at least two batteries and the dimmer on/off switch;
 a coiled wiring connected to the circuitry and the dimmer on/off switch;
 a screw cap removably affixed to the first end;
 an insulation disposed within the rod, the insulation disposed from the cushioned handle to proximal to the second end;
 a continuation of the coiled wiring disposed within the rod, the continuation of the coiled wiring extended from the cushioned handle to proximal to the second end;
 a straight wiring extended from the continuation of the coiled wiring to the second end;
 a tip reinforcement disposed within the rod second end;
 a rounded lens disposed on the second end;
 an LED disposed within the lens and partially within the tip reinforcement, the LED connected to the straight wiring, within the tip reinforcement;
 a pair of threaded reel attachments disposed on the rod proximal to the taper, the reel attachments removably receiving a reel;
 a cushioned grip disposed medially along the rod, proximal to the threaded reel attachments;
 a series of spaced apart eyelets affixed exteriorly to the rod, the eyelets disposed between the threaded reel attachments and the second end.

* * * * *